(12) United States Patent
Eimer (10) Patent No.: US 7,306,128 B2
(45) Date of Patent: *Dec. 11, 2007

(54) CONTAINER CLOSURE

(75) Inventor: John Eimer, Summerfield, FL (US)

(73) Assignee: Seaquist Closures L.L.C., Mukwonago, WI (US)

( * ) Notice: Subject to any disclaimer, the term of this patent is extended or adjusted under 35 U.S.C. 154(b) by 326 days.

This patent is subject to a terminal disclaimer.

(21) Appl. No.: 11/062,192

(22) Filed: Feb. 18, 2005

(65) Prior Publication Data

US 2006/0037976 A1 Feb. 23, 2006

Related U.S. Application Data

(63) Continuation-in-part of application No. 10/920,941, filed on Aug. 18, 2004.

(51) Int. Cl.
*B65D 35/38* (2006.01)

(52) U.S. Cl. .................. 222/494; 222/213; 222/490; 137/847

(58) Field of Classification Search .............. 222/212, 222/213, 490–494; 137/847
See application file for complete search history.

(56) References Cited

U.S. PATENT DOCUMENTS

| | | | |
|---|---|---|---|
| 1,607,993 A | 11/1926 | Loewy | |
| 1,977,227 A | 10/1934 | Berendt et al. | |
| 2,552,715 A | 5/1951 | Gray et al. | |
| 2,663,467 A | 12/1953 | Douglass et al. | |
| 2,679,954 A | 6/1954 | Barnes | |
| 2,937,795 A | 5/1960 | Ciliberti | |
| 3,179,301 A | 4/1965 | Lught | |
| 3,241,726 A | 3/1966 | Chester | |
| 3,387,624 A | 6/1968 | Soucy | |
| 3,884,396 A | 5/1975 | Gordon et al. | |
| 4,220,248 A | 9/1980 | Wilson et al. | |
| 4,269,330 A | 5/1981 | Johnson | |
| 4,620,648 A | 11/1986 | Schwartzman | |
| 4,709,836 A | 12/1987 | Andersen | |
| 4,917,253 A | 4/1990 | Dutt | |
| 5,005,737 A | 4/1991 | Rohr | |

(Continued)

FOREIGN PATENT DOCUMENTS

EP 0 463 658 A1 1/1992

(Continued)

*Primary Examiner*—J. Casimer Jacyna
(74) *Attorney, Agent, or Firm*—Wood, Phillips, Katz, Clark & Mortimer (57) ABSTRACT

A one-piece container closure with a collar, stiff planar triangular leaflets attached by linear hinges to the collar, and thin flexible foldable webs attached to and extending between the leaflets. The leaflets are flat with the webs folded beneath in closed closure position. The leaflets are pivoted upwardly with webs unfolded therebetween in open position. An integral cap is attached to the collar by a snap-action bow-tie hinge. A central pin on the cap seals with the leaflets when the cap is closed. The closure is integrally molded in open position with raised leaflets and unfolded webs, leaflets then being lowered and the webs folded to closed position while the closure is still warm, the cap then being closed, and the closed closure then being annealed to establish the elastic positional memory of the leaflets and hinges in the closed position when product is not being dispensed through the closure.

7 Claims, 8 Drawing Sheets

U.S. PATENT DOCUMENTS

| | | |
|---|---|---|
| 5,271,531 A | 12/1993 | Rohr et al. |
| 5,439,143 A | 8/1995 | Brown et al. |
| 5,456,294 A | 10/1995 | Tsao |
| 5,676,289 A | 10/1997 | Gross et al. |
| 5,927,566 A | 7/1999 | Mueller |
| 6,079,594 A | 6/2000 | Brown et al. |
| 6,089,411 A | 7/2000 | Baudin et al. |
| 6,095,381 A | 8/2000 | Schwanenberg |
| 6,213,355 B1 | 4/2001 | Schwanenberg |
| 6,230,940 B1 | 5/2001 | Manning et al. |
| 6,273,296 B1 | 8/2001 | Brown |
| 6,273,305 B1 | 8/2001 | Fioravanti et al. |
| 6,279,783 B1 | 8/2001 | Brown et al. |
| 6,367,668 B1 | 4/2002 | Schwanenberg |
| 6,405,901 B1 | 6/2002 | Schantz et al. |
| 6,427,874 B2 | 8/2002 | Brown et al. |
| 6,457,613 B1 | 10/2002 | Patterson |
| 6,530,504 B2 | 3/2003 | Socier |
| 6,673,295 B1 | 1/2004 | Fillmore |
| 7,048,154 B2 * | 5/2006 | Phillips et al. .............. 222/212 |
| 2002/0079334 A1 | 6/2002 | Schantz et al. |
| 2002/0125272 A1 | 9/2002 | Sekendur |
| 2002/0134801 A1 | 9/2002 | Stewart |
| 2003/0189067 A1 | 10/2003 | Stull et al. |

FOREIGN PATENT DOCUMENTS

| | | |
|---|---|---|
| WO | WO 82/01360 | 4/1982 |

* cited by examiner

CONTAINER CLOSURE

This application is a continuation-in-part of U.S. patent application Ser. No. 10/920,941, filed on Aug. 18, 2004, naming John Eimer as inventor. Applicant claims the benefit of the prior application.

FIELD OF THE INVENTION

The present invention relates to plastic closures for fluid containers that dispense product through a container opening upon application of hand pressure.

BACKGROUND OF THE INVENTION

Prior art closures for fluid containers are myriad in design and construction. These often require complicated molding, assembly of parts, are expensive to manufacture, do not close and seal properly, do not provide a variable closure opening dependent on the hand pressure used to dispense, are subject to opening upon inadvertent squeezing, and/or are of a shape not conducive to easy handling and shipping.

Prior art U.S. Pat. No. 1,977,227 (1934) discloses a closure wherein panels are separately placed in a mold in an overall frusto-conical shape, with rubber then poured over and under the panels to form a resilient part between the panels. An opening slit is then cut in the rubber. The frusto-conical shape of the panels is the closed position of the closure, and the panels cannot be folded to a flat position for ease of handling and shipping. Accordingly, the rubber is not folded in either the open or closed positions of the closure, and the sides of the panels are always separated. This multi-piece closure among other deficiencies is labor intensive and expensive to manufacture.

A further prior art closure is shown in PCT International Publication Number WO 82/01360 (1982), having a complex arrangement of triangular panels in overlapping layers of inner and outer seals, or a single layer of such panels but without interconnecting webs or membranes or other sealing means between the panels. In the latter instance, reliable sealing is unlikely, and opening upon inadvertent squeezing is not prevented.

Other prior art closures are known that have slitted configurations or various other constructions.

SUMMARY OF THE INVENTION

The present invention is intended to provide a plastic one-piece container closure which is strongly constructed, easily and cheaply manufactured, requires no assembly, functions reliably and efficiently, closes and seals properly, provides a variably-sized closure opening depending on hand pressure of the user, does not inadvertently open, and is easy to handle and ship by virtue of its shape. The closure will be used to dispense lotions and various other fluid products from a container.

The closure has an annular collar for attachment to the container about its opening. A plurality of leaflets are attached by hinges to the collar, and a plurality of flexible and foldable webs are attached to and extend between adjacent pairs of leaflets. The individual leaflets are stiff planar members, and the hinges for the leaflets are each linear rather than the curvilinear arcs shown in co-pending patent application Ser. No. 10/920,941. The leaflets extend adjacent one another in an essentially flat horizontal configuration in the closed position of the closure with the webs folded in pleats beneath the adjacent leaflets. When the container is squeezed to dispense product, the leaflets pivot upwardly at their hinges under the influence of fluid pressure. The leaflets separate from one another upon upward pivoting and the webs unfold and extend between the separated leaflets to form with the leaflets the closure dispensing opening.

The leaflets are triangular in shape, having long sides that converge toward the central axis of the closure. The webs are attached to the long sides of the leaflets, and the linear hinges are attached to the short sides of the leaflets. The flat (planar) leaflets and straight-line (linear) hinges assist in providing a smooth opening and closing of the closure.

A cap for the closure is integrally attached to the collar by a snap-action, bow-tie hinge. The cap has a central pin in its undersurface that seals against the radially innermost portions of the leaflets upon closing the cap onto the closure.

The closure and cap for the present invention may be molded as a unitary member. The closure is initially molded in the open position with the leaflets extending angularly upward and separated from one another, and with the webs unfolded and extending between adjacent pairs of leaflets. Thereafter, while the leaflets and hinges are warm, the leaflets are pivoted downwardly to the closed closure position where the leaflets extend adjacent one another in an essentially planar surface and the webs are folded beneath the adjacent leaflets. The cap is then closed on the closure and the cap and closure are removed from the mold. The closed closure with its closed cap may then be annealed to break the as-molded open positional memory of the closure and establish the closed closure position as the positional elastic memory of the closure when product is not being dispensed by the user.

Other features and advantages of the present invention will be apparent from the following description, drawings and claims.

DETAILED DESCRIPTION OF EMBODIMENT

Figure 1:
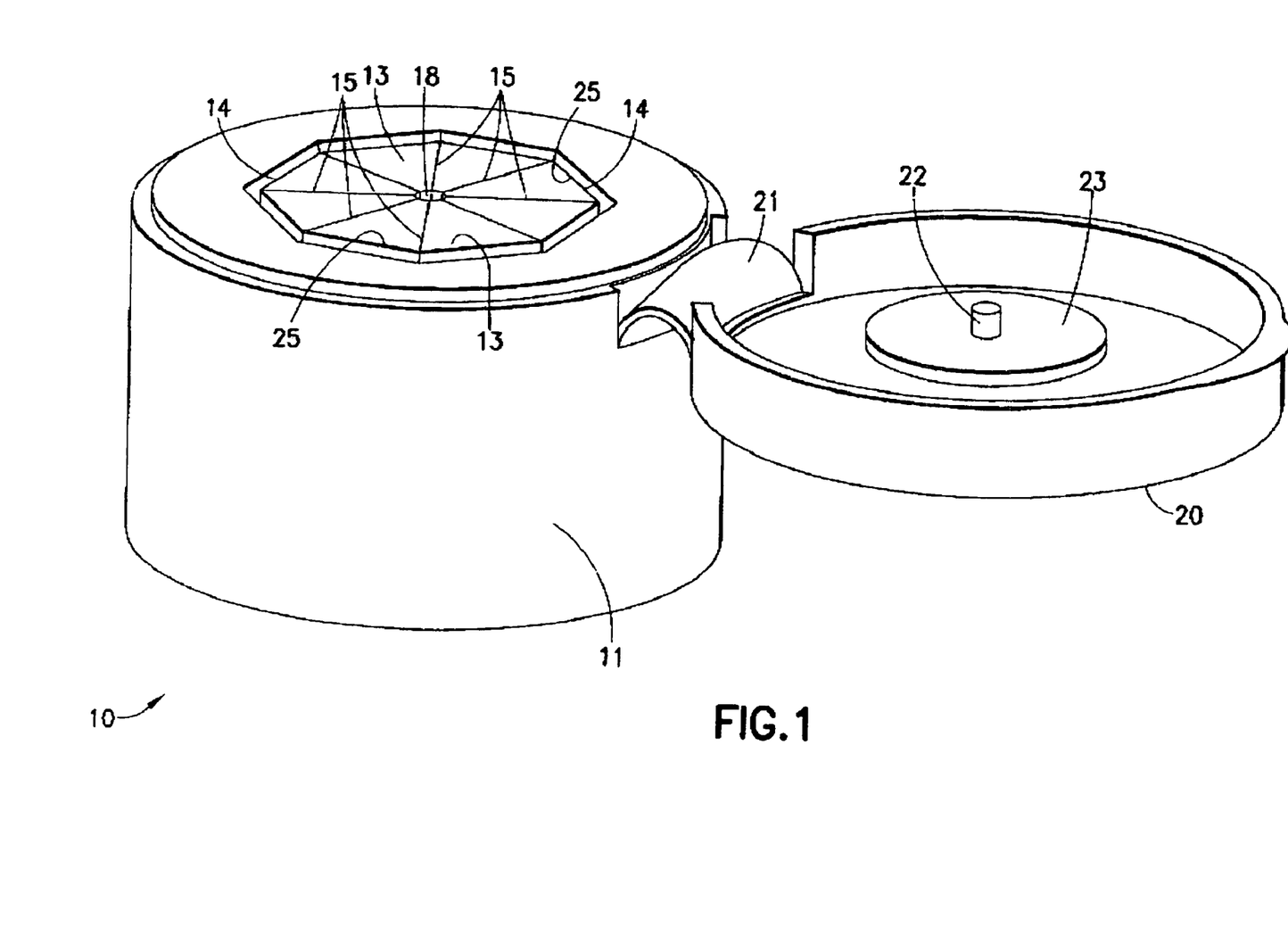
FIG. 1 is a perspective view of the closure of the present invention in closed position but with its then normally closed cap open for clarity of illustration.
Figure 2:
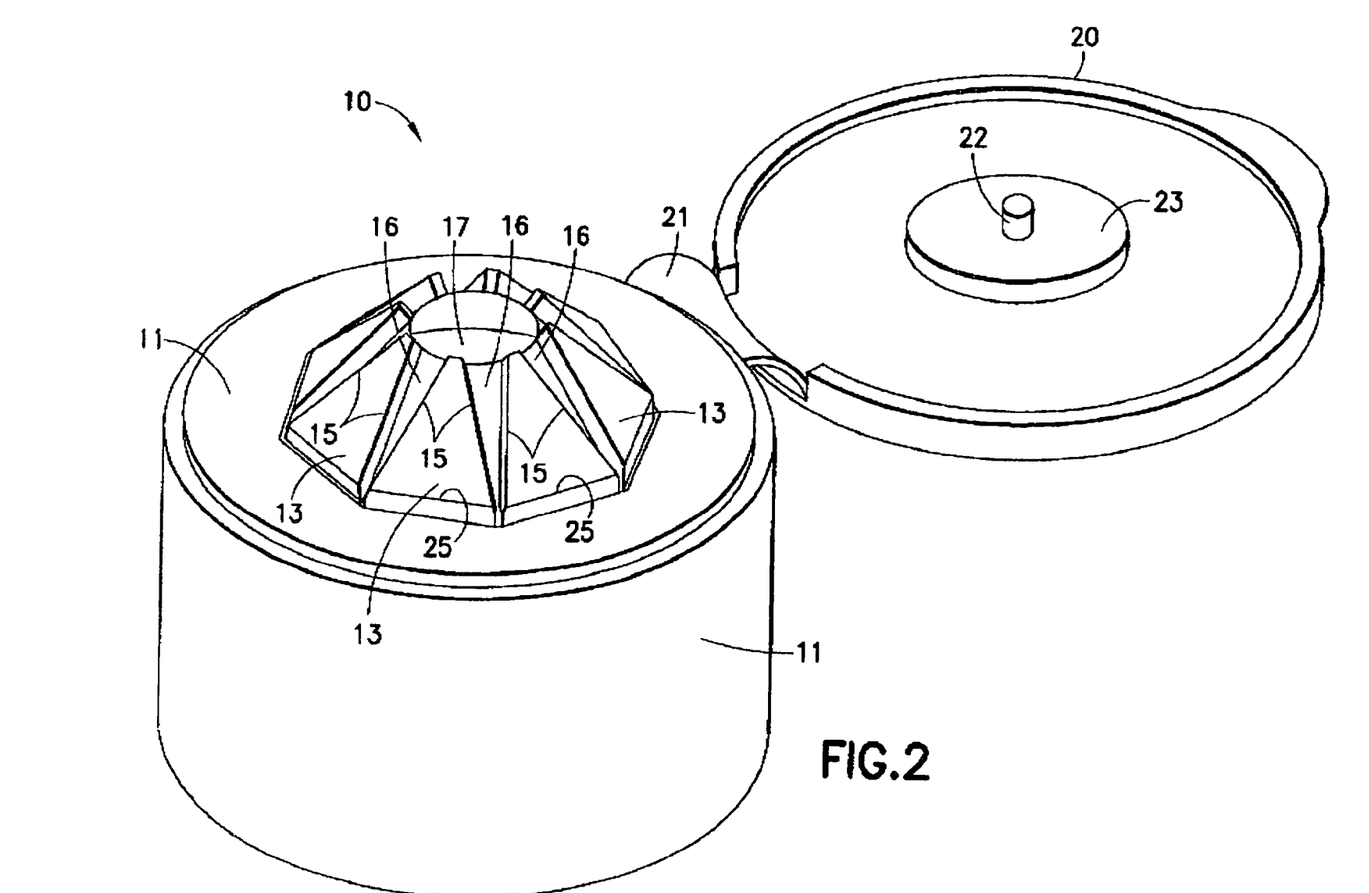
FIG. 2 is a perspective view of the closure of the present invention in open position.

Referring to FIGS. 1 and 2, plastic closure 10 is shown having annular collar 11 for attachment to a fluid container (not shown) about a dispensing opening in the container.

Figure 3:
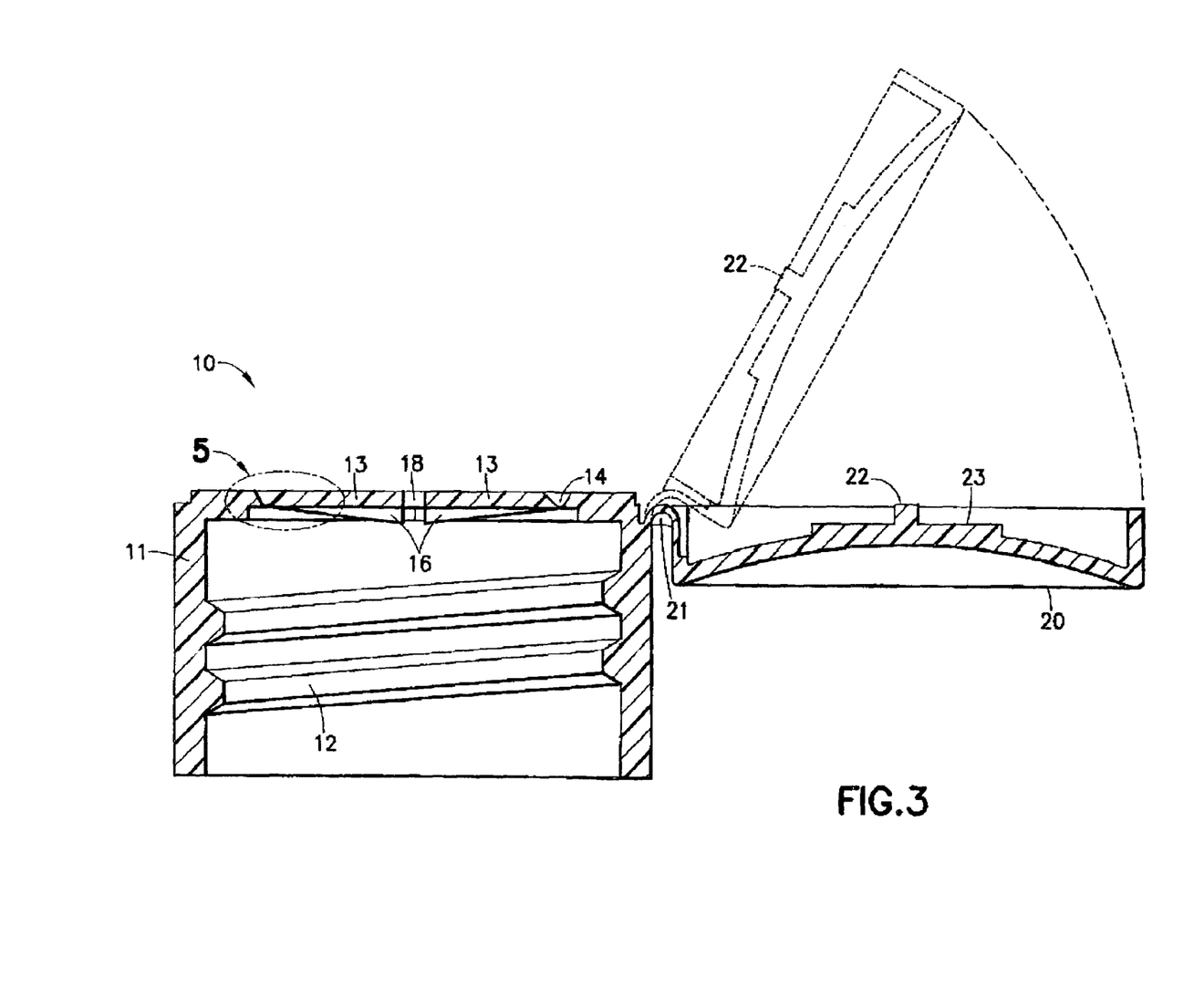
FIG. 3 is a cross-sectional view of the closure of the present invention in closed position but with its normally closed cap open.
Figure 4:
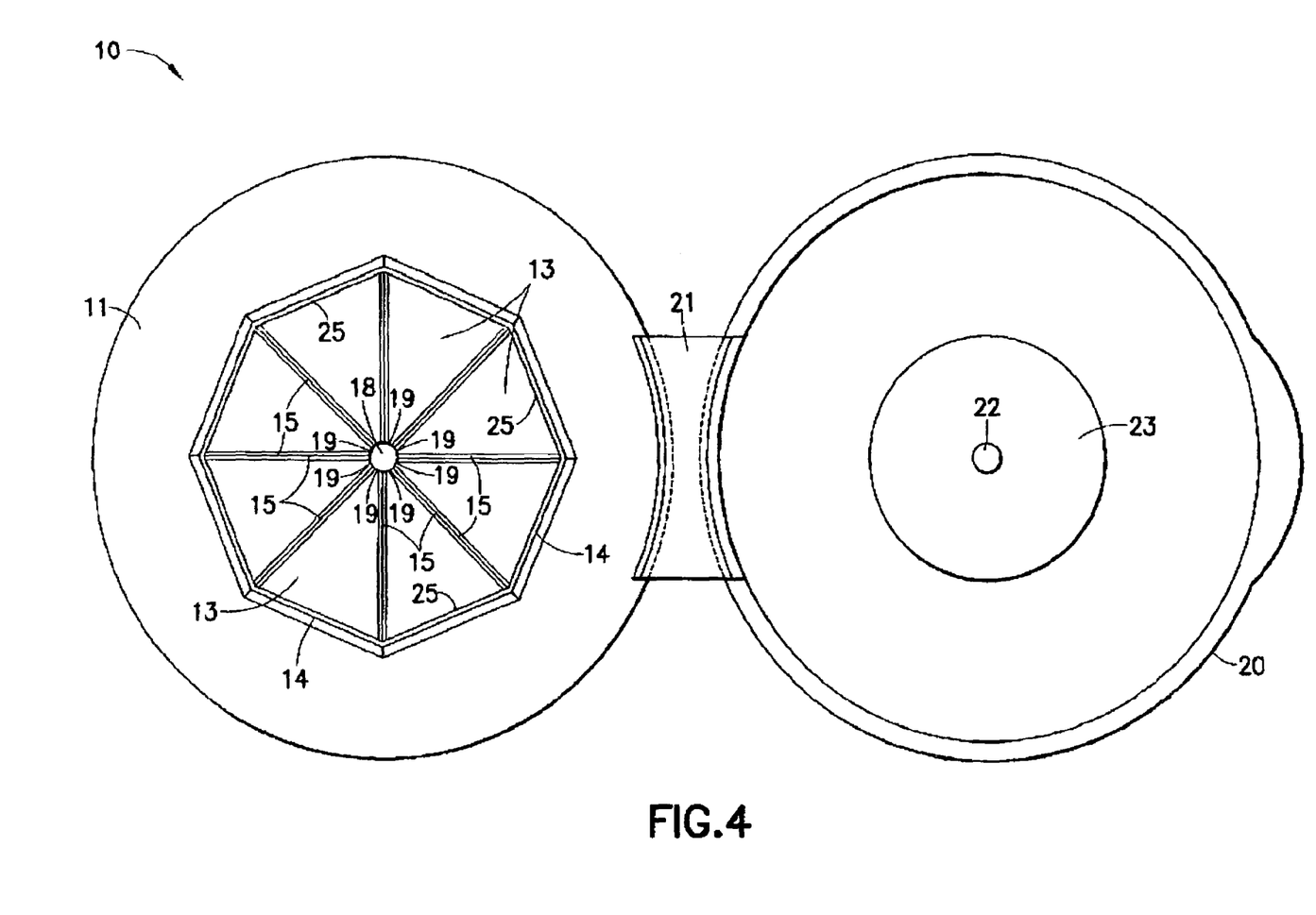
FIG. 4 is a top plan view of the closure of the present invention in closed position but with its normally closed cap open.
Figure 5:
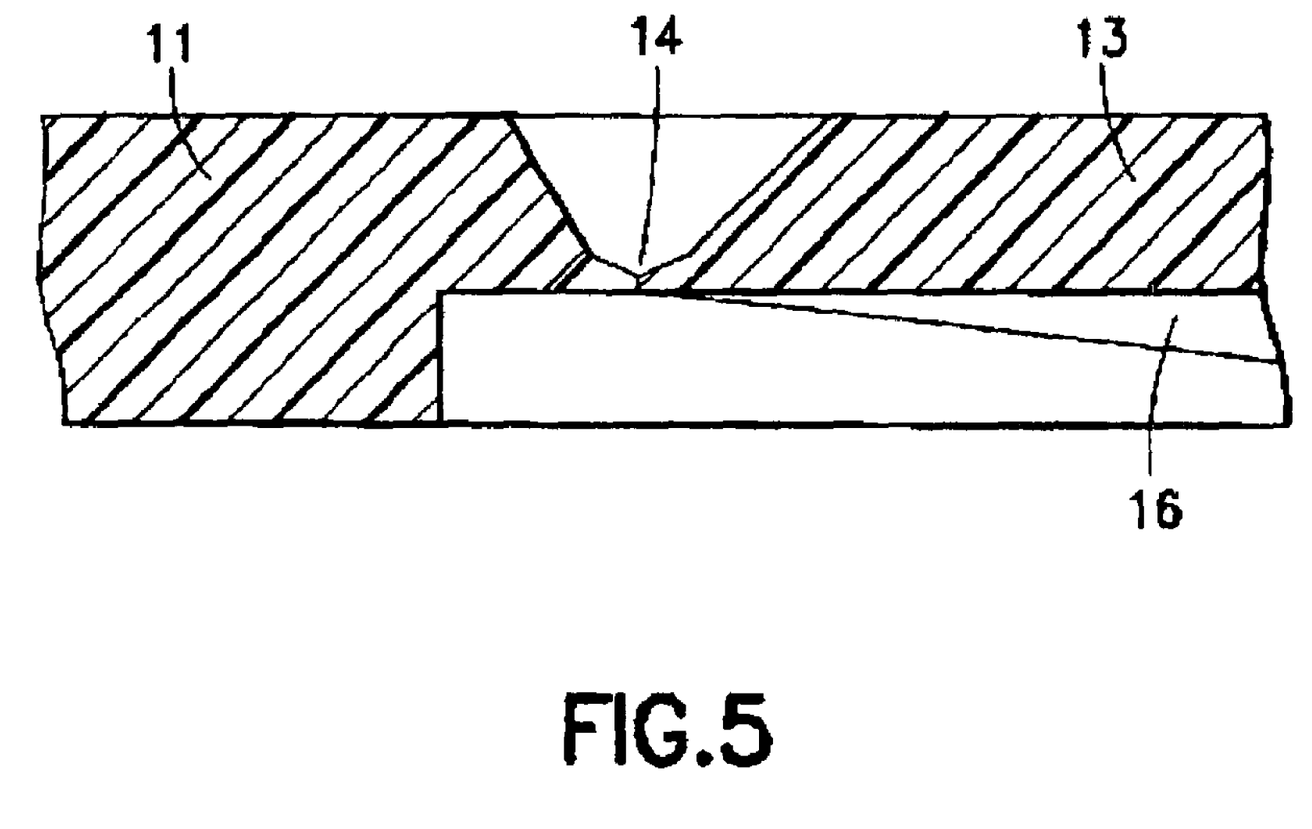
FIG. 5 is a fragmentary view taken from FIG. 3 and illustrating in cross-section the hinging of the leaflets to the collar in the closure of the present invention.

Attachment for example may be by threads 12 (see FIG. 3), snap fittings (not shown), or other known attachment means.

A plurality of stiff planar leaflets 13 are positioned at the top of collar 11 and are attached by integral linear hinges 14 (see in particular FIG. 5) to collar 11. Eight such leaflets 13 are shown, although the number may obviously vary. In the closed position of closure 10, leaflets 13 are shown in FIGS. 1, 3, 4 and 5 extending adjacent one another in an essentially flat horizontal surface. Each leaflet 13 is a triangular shape having two long sides 15 that converge in a direction away from the hinge 14 associated with the particular leaflet 13. The long sides 15 of each leaflet 13 lie adjacent the long sides of adjacent leaflets 13 in the closed position of closure 10. The short side 25 of each leaflet 13 lies adjacent the straight-line (linear) hinge 13 associated with that leaflet.

Integrally attached to and extending between the leaflets 13 are a plurality of thin, flexible and foldable webs 16, webs 16 each extending between and attached to the long sides 15 of two adjacent leaflets 13. Webs 16 might be of the order of 0.005 inches thick and leaflets 13 might be of the order of 0.030 inches thick, solely as an example. In the closed position of closure 10, each web 16 folds beneath the adjacent pair of leaflets 13 and the long leaflet sides 15 lie adjacent one another separated by say 0.010 inches solely as an example. When the closure opens, the long leaflet sides 15 will be spaced from one another as shown in FIG. 2.

Figure 6:
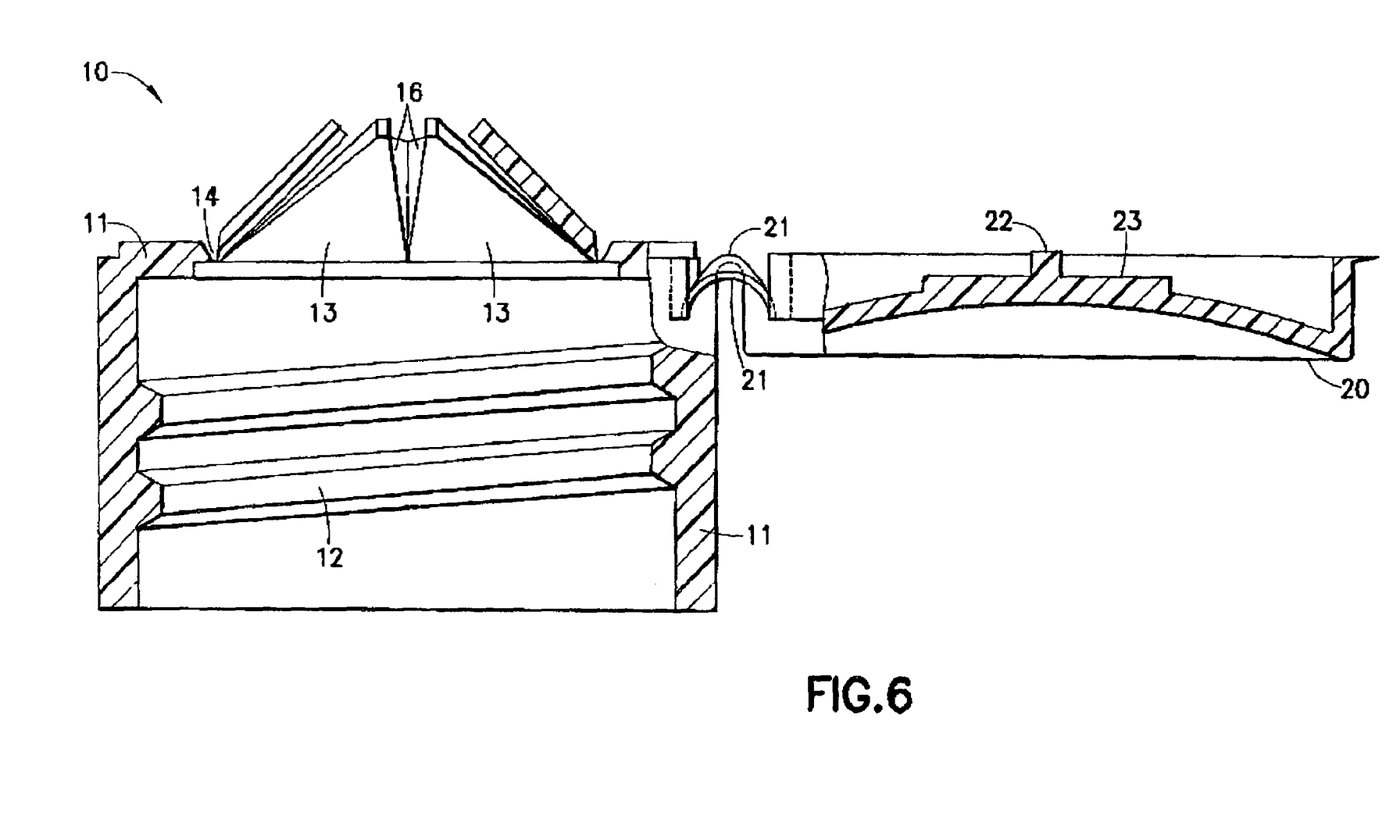
FIG. 6 is a cross-sectional view of the closure of the present invention in open position.
Figure 7:
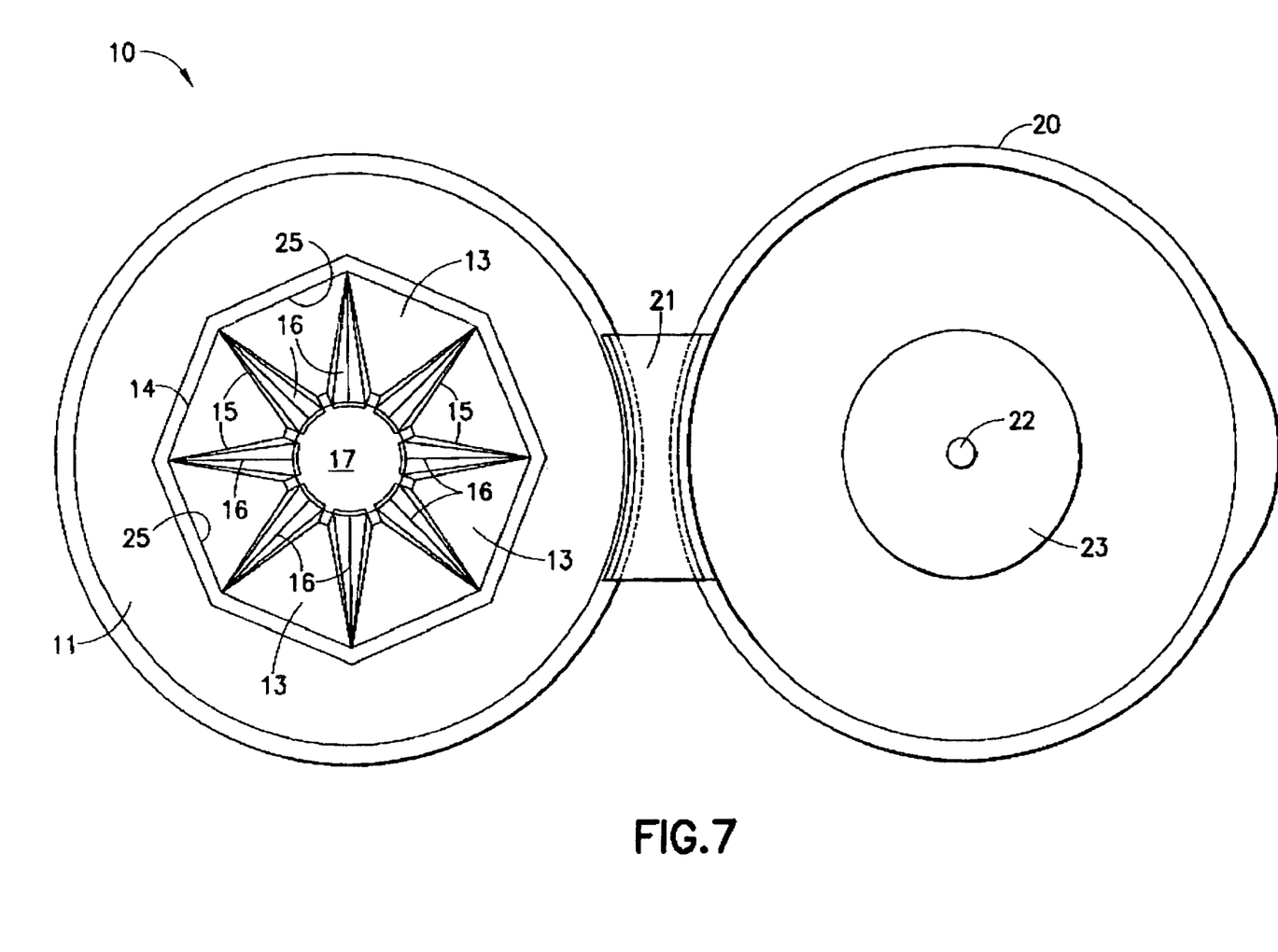
FIG. 7 is a top plan view of the closure of the present invention in open position.
Figure 8:
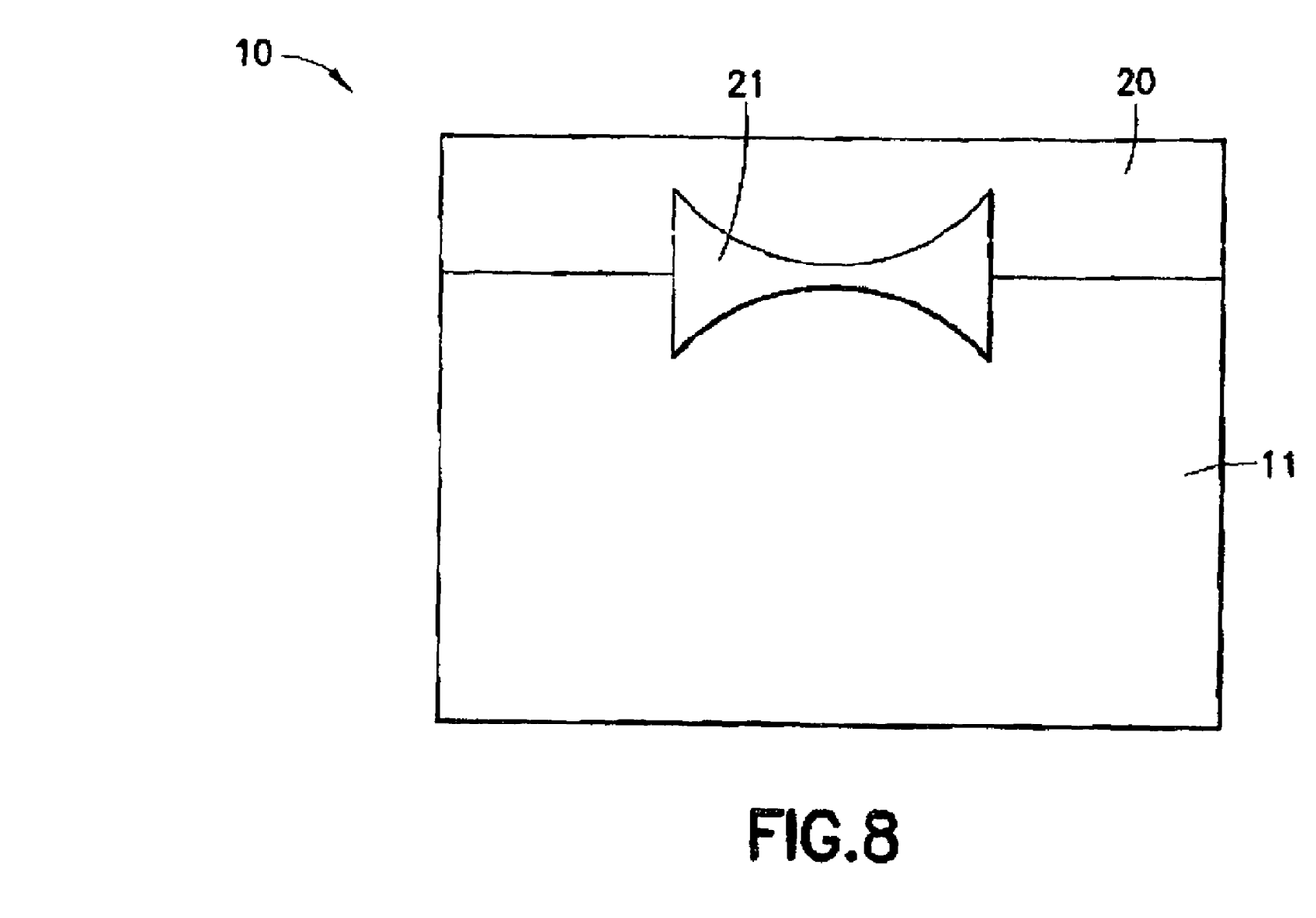
FIG. 8 is a rear elevational view of the closure of the present invention in closed position and generally illustrating a bow-tie hinge connecting the closure cap to the closure collar.

Closure 10 will generally be attached to a squeezable fluid container, for example. When the container is manually squeezed, the pressure of the fluid to be dispensed forces the leaflets 13 from their essentially planar FIG. 1 position to the FIG. 2 position wherein each leaflet has pivoted upwardly about its hinge 14 and is now spaced from its adjacent leaflets. Webs 16 have now unfolded and straightened out between leaflets 13. Dispensing opening 17 is thereby created in closure 10 to allow dispensing of the fluid product. Less hand pressure on the container will create a smaller opening 17, and more hand pressure will create a larger opening. This open condition of the closure 10 is illustrated in FIGS. 2, 6 and 7, with all but one of the webs 16 not shown in FIG. 6 for clarity of illustration.

After the desired amount of product has been dispensed by closure 10 and the squeezing pressure is released, leaflets 13 will pivot back downwardly about their thin integral membrane hinges 14 to again assume the FIG. 1 closed position of closure 10, with webs 16 once again folding up between and beneath adjacent leaflets 13. This pivoting downwardly of leaflets 13 is assisted by the suction of product back into the container after the container is no longer squeezed to dispense product.

Closure 10 also includes cap 20 integrally attached to collar 11 by bow-tie hinge 21. Cap 20 has central pin 22 and surrounding surface 23 extending from the under surface (when closed) of the cap 20. Bow-tie hinge 21 snaps between the open and closed positions of cap 20 on closure 10, and may be one of various known snap-action hinge designs in the prior art. When cap 20 is in its closed position and leaflets 13 are in their essentially flat orientation, central pin 22 extends into central opening 18 at the central axis of the closure defined by the radially inward tips 19 (see FIG. 4) of leaflets 13. Tips 19 seal against central pin 22. Under surface 23 of cap 20 may act to hold leaflets 13 flat in the closed cap position. Snap means may be provided for cap 20 to snap at its periphery onto the periphery of collar 11 in the closed position. The snap-action bow-tie hinge 21 acts to hold cap 20 in closed position even in the presence of accidental squeezing of the container.

Collar 11, leaflets 13, hinges 14, webs 16, cap 20 and bow-tie hinge 21 may all be integrally molded with one another into a one-piece plastic closure, in a single molding operation. The plastic may be polypropylene, for example. In particular, the closure is molded in a single molding operation of all the parts into the orientation of parts as shown in FIG. 2. Webs 16 are therefore molded in their unfolded position. Thereafter, while the hinges 14 and leaflets 13 are still warm, the leaflets 13 are pivoted downwardly to the closed FIG. 1 position. Webs 16 accordingly fold under the leaflets 13. Cap 20 is then swung upwardly (see FIG. 3) and snapped over and onto the top of collar 11, and the closed closure 10 is removed from the mold.

When closure 10 is thereafter to be used by a consumer and cap 20 is opened to dispense product through the closure, it is desirable that the elastic positional memory of the leaflets 13 and hinges 14 be in the closed FIG. 1 position except when product is being dispensed. To obtain this result, a further annealing operation may be carried out upon the closed closure 10, with its cap also closed, after the closed and capped closure 10 is removed from the mold. In this event, the closure will be heated at a sufficient time and temperature to establish the closed elastic positional memory of the leaflets 13 and hinges 14. The time and temperature will vary depending on the material and dimensions of the closure. When the cap is thereafter opened and after product is dispensed through the closure in its FIG. 2 position, the leaflets will then automatically return to their closed FIG. 1 position in the absence of the product container being squeezed.

The several features of the present invention described above together define a unique and simple one-piece container closure which is easily manufactured, inexpensive, requires no assembly, provides a variable flow depending on hand pressure, prevents dispensing in the presence of inadvertent squeezing of the container, functions reliably and efficiently for the consumer, is easily handled and shipped, and may be placed upside down on a surface if desired.

It will be appreciated by persons skilled in the art that variations and/or modifications may be made to the present invention without departing from the spirit and scope of the invention. The present embodiment is, therefore, to be considered as illustrative and not restrictive. It should also be understood that positional terms as used in the specification are used and intended in relation to the positioning shown in the drawings, and are not otherwise intended to be restrictive.

What is claimed is:

1. A closure for a fluid container that dispenses product through a container opening by the application of hand pressure, comprising: an annular collar for attachment to the container about its opening; a plurality of stiff planar triangular leaflets attached by linear hinges to the collar; a plurality of flexible and foldable webs attached to and extending between adjacent pairs of leaflets; said leaflets extending adjacent one another in an essentially flat surface in the closed position of the closure with the webs folded like pleats beneath the adjacent leaflets; said leaflets upon product dispensing being pivotable upwardly at their hinges by fluid pressure to separate from one another in the open position of the closure, with said web members unfolding and extending between the separated leaflets to form with the leaflets the closure dispensing opening; said leaflets in the absence of product dispensing being pivotable downwardly to return to their closed closure position adjacent one another with said webs folded beneath the leaflets.

2. The closure of claim 1, wherein the collar, leaflets, webs and hinges comprise a one-piece integrally molded plastic closure.

3. The closure of claim 1, wherein said triangular leaflets each have two long sides that converge in a direction away from a third side of the triangle, that respectively lie adjacent the long sides of adjacent leaflets in the closed position of the closure, and that are separated from the long sides of the adjacent leaflets when the closure opens.

4. The closure of claim 3, wherein the webs are attached to the long sides of the triangular leaflet members, and the linear hinges are attached to the short sides of the triangular leaflet members.

5. The closure of claim 1, having a cap for extending over the closure when closed and attached to the collar by an integral hinge.

6. The closure of claim 5, said closure having a central axis and said leaflets each extending from its respective linear hinge radially inward toward said central axis, said cap having a central pin and a surrounding surface for holding said leaflets in a closed position upon closing the cap, said radially innermost portions of said leaflet members contacting and sealing against said pin when the cap is closed.

7. The closure of claim 5, wherein the integral hinge is a snap-action bow-tie hinge.

* * * * *